United States Patent [19]
Kopernik et al.

[11] 3,808,593
[45] Apr. 30, 1974

[54] BRAKE ARRANGEMENT OR THE LIKE PROVIDED WITH AN ELECTROMECHANICAL WEAR-MONITORING TRANSDUCER

[75] Inventors: Viktor Kopernik, Ettlingen; Frieder Heintz, Karlsruhe, both of Germany

[73] Assignee: Robert Bosch GmbH, Stuttgart, Germany

[22] Filed: May 5, 1972

[21] Appl. No.: 250,670

[30] Foreign Application Priority Data
May 13, 1971  Germany............... 2123750

[52] U.S. Cl................... 340/52 A, 340/69
[51] Int. Cl............................ B60t 17/22
[58] Field of Search........... 340/52 A, 52 B, 69; 200/61.4, 61.42, 61.44

[56] References Cited
UNITED STATES PATENTS
3,339,676  9/1967  Quinn................ 340/52 A UX
2,087,386  7/1937  Norton..................... 340/52 A Primary Examiner—Alvin H. Waring
Attorney, Agent, or Firm—Michael S. Striker

[57] ABSTRACT

A brake arrangement or the like includes at least one component subject to wear. A monitoring arrangement monitors the degree of wear of such component and has an output at which are produced distinguishable signals corresponding to minimum, maximum and intermediate monitored degrees of wear of said component.

20 Claims, 4 Drawing Figures

BRAKE ARRANGEMENT OR THE LIKE PROVIDED WITH AN ELECTROMECHANICAL WEAR-MONITORING TRANSDUCER

BACKGROUND OF THE INVENTION

The present invention relates to the monitoring in a mechanical arrangement of components subject to wear. More particularly, the invention relates to the monitoring of mechanical components having layers of friction material, such as for instance the brake or friction linings found in brake arrangements, friction clutches, and so on.

Still more particularly, the invention relates to the measuring and monitoring of the reduction in thickness of brake linings, and the like, as a result of prolonged wear.

It is of course well known that the safety of a particular automotive vehicle, for instance, depends in largest measure on the reliability and effectiveness of the vehicle braking system. Equally well known is the fact that after prolonged use the brake linings of such brake arrangement will become worn away to a very significant extent. After the wear is considerably advanced, the brake system may become inoperative, or its effectiveness may be very greatly reduced, leading to the greatest possible threat to the safety of persons riding in the vehicle. Accordingly, it is a consideration of paramount importance that the linings of brakes, friction clutches and the like, not be permitted to wear away to such an extent as might create such a safety hazard.

Ordinarily, the linings of brakes, friction clutches, and the like, are subjected to simple visual inspection by auto mechanics. Such method of assuring that the brake linings are not excessively worn is most unsatisfactory and inconvenient, because of the need for disassembling considerable portions of the braking system, so that the worn linings can be exposed to view. Such disassembly, and the subsequent reassembly, is time-consuming and therefore, because of the high cost of labor, expensive.

Arrangements are known in the prior art for indicating when the thickness of the brake linings has decreased to a preselected unacceptable value. One known arrangement, for example, makes use of an electrical contact embedded within the actual brake lining layer. After the brake lining layer becomes worn to a certain extent, the embedded electrical contact becomes exposed and makes contact with another electrical member, closing an electrical circuit and thereby generating a signal indicative of the fact that the brake lining layer has worn to an extent corresponding to the depth at which the electrical contact was buried.

Another known thickness-threshold arrangement makes use of such a threshold contact bridged by an electrical resistance. A rather weak electric current flows through a monitoring lamp provided on the vehicle dashboard, and the weak illumination of such indicator lamp serves as positive indication that the brake linings are still in acceptable condition. The indicator lamp lights up fully only when the parallel resistance is bridged over from the threshold contact.

Although these prior-art arrangements serve their purpose, in so far as they do provide a signal when the brake lining has become unacceptably worn, they are nevertheless quite disadvantageous. Specifically, they provide no indication of the exact degree of brake lining wear, or the like, so that the vehicle driver is in no position to plan for a change of brake linings until he is actually informed that the brake linings are no longer properly functional. Thus, for example, during a major checkup of his vehicle, the owner may not authorize a change of brake linings, the indicator lamp having failed to indicate the necessity for such change. It frequently happens, however, that the indicator lamp will light up as soon as a week or two thereafter. Clearly, if the vehicle owner knows that the brake linings, or the like, are very near a condition of unacceptable wear, he will want to schedule the necessary work at a convenient time, and not wait for the brake linings to reach a condition of completely unacceptable wear.

SUMMARY OF THE INVENTION

It is accordingly a general object of the invention to provide a monitoring system for mechanical arrangements having components that are subject to wear, such monitoring system providing an indication of the degree to which such components have become worn.

It is another object to provide such a monitoring system which is capable of producing electrical signals corresponding to the degree of wear of such components.

It is an important object of the invention to provide such a monitoring system for mechanical arrangements including parts which are provided with friction surfaces, such as the linings of brakes, friction clutches, and the like, the monitoring system then providing an indication of the actual thickness of such linings.

It is a particular object of the invention to provide a braking arrangement or the like having built-in wear-monitoring capability.

It is another object of the invention to provide a monitoring system adapted to produce electrical signals having minimum, maximum and intermediate values corresponding to different degrees of wear of components subject to wear.

It is a still further object to provide such system adapted to continuously monitor the degree of wear of components subject to wear, and adapted to produce electrical analog signals having a continuous range of values corresponding to the continuously varying degree of wear of such components.

It is yet another object to provide such system including electromechanical transducer means adapted to produce such signals.

It is a related object to provide a system comprising electromechanical transducer means including mechanical input means operatively associated in a simple manner with the components subject to wear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
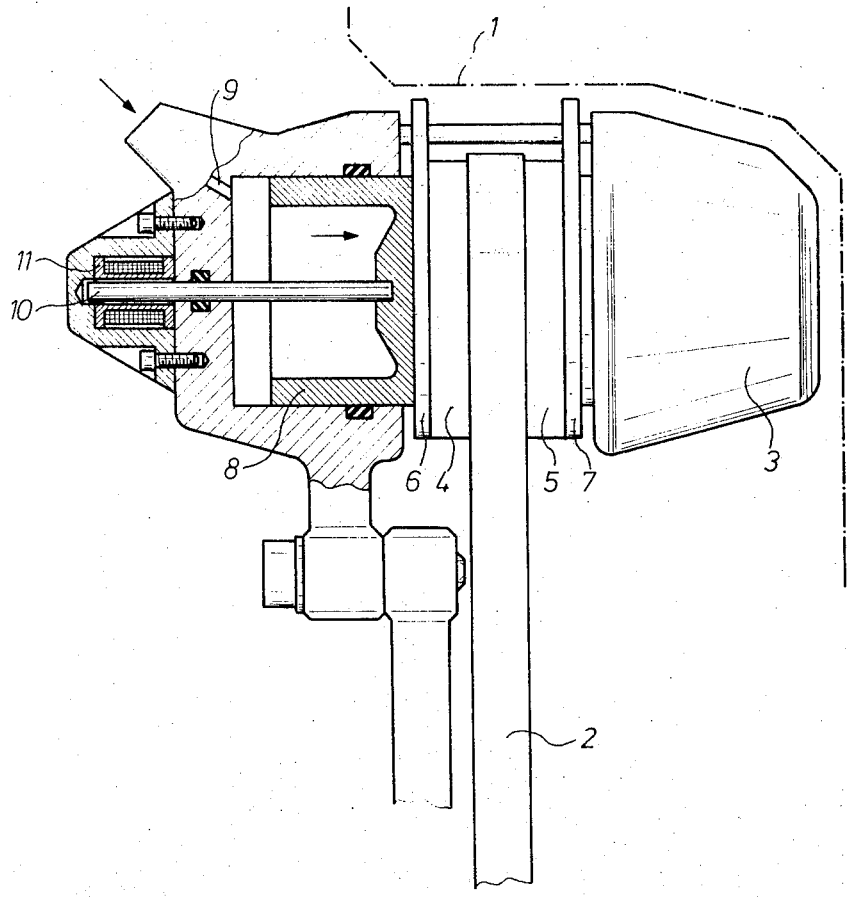
FIG. 1 illustrates in somewhat schematic form a vehicle braking arrangement according to the invention and having built-in wear-monitoring capability.

FIG. 1 illustrates a braking arrangement for an automotive vehicle. The illustrated arrangement is positioned, in conventional manner, behind the respective vehicle wheel, in proximity to the wheel rim 1. A brake saddle 3 surrounds on two sides a brake disk 2. Two brake shoe lining components 4 and 5 have friction surface portions adjacent respective axial surfaces of brake disk 2, and are pressed against such surfaces when the vehicle wheel is to be braked. Brake shoe lining components 4 and 5 are mounted on respective mounting plates 6 and 7. Each of mounting plates 6, 7 is connected with a respective hydraulic piston, of which in FIG. 1 only the piston 8 associated with mounting plate 6 is explicitly illustrated.

Hydraulic pressure fluid enters the cylinder in which piston 8 is slidingly mounted through fluid inlet 9, and serves to impel piston 8 in the direction of the arrow, thereby pressing mounting plate 6 and brake shoe lining 4 against brake disk 2. Brake shoe lining component 5 is pressed against brake disk 2 in similar fashion.

It will be seen that the braking arrangement of FIG. 1 includes brake shoe lining wear-monitoring means comprising a stationary first part 11 and a second part 10. The monitoring means of the invention is here illustrated as an electromechanical transducer. The first part 11 of the monitoring means is provided in form of the winding of an inductive pick-up arrangement, and second part 10 is provided in form of an elongated shaft fixedly mounted at one end to the hydraulic piston 8 and, at its other end, freely slidable through and with respect to the winding 11. In this embodiment, at least the left-hand end portion of shaft 10 is of ferromagnetic material and serves as the ferromagnetic core for pick-up winding 11.

When the braking arrangement is activated, and accordingly when mounting plate 6 is pressed to the right towards brake disk 2, shaft 10 will move to the right a distance corresponding exactly to the distance moved by the mounting plate. It will be appreciated that the magnitude of this distance will vary as a direct function of the thickness of brake shoe lining component 4; that is, when component 4 is still free from wear, shaft 10 will move to the right a certain distance which is appreciably less than the distance it will move when component 4 is completely worn away.

Movement of shaft 10 serves to vary the inductance associated with pick-up winding 11, and such inductance will be varied to a greater or lesser extent depending on the degree of wear of brake shoe lining 4. Accordingly, if winding 11 is for example energized by an A.C. current having approximately constant amplitude, the voltage developed across winding 11 will br a direct function of the axial displacement of shaft 10, and thereby of the degree of wear of component 4. With the arrangement of FIG. 1, the degree of wear of component 4 is continuously monitored, and electrical signals are produced having a continuous range of values corresponding to the continuously varying degree of wear of component 4. Specifically, it will be appreciated that the electrical signal produced can have a minimum value corresponding, for instance, to no wear of component 4, a maximum value corresponding, for instance, to complete wearing away of component 4, and intermediate values corresponding to intermediate degrees of wear. Thus, winding 11 and shaft 10 together form an electromechanical transducer, shaft 10 constituting the mechanical input means of such tranducer and winding 11 constituting the electrical output means thereof.

Figure 2:
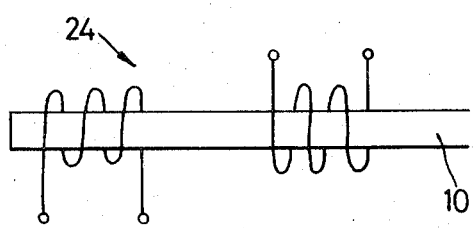
FIG. 2 illustrates in electrical schematic form a possible modification of part of the arrangement of FIG. 1.
Figure 3:
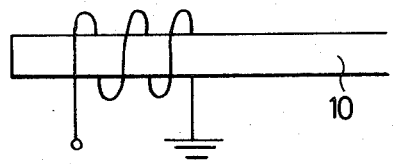
FIG. 3 illustrates in electrical schematic form a further possible modification of part of the arrangement of FIG. 1.
Figure 4:
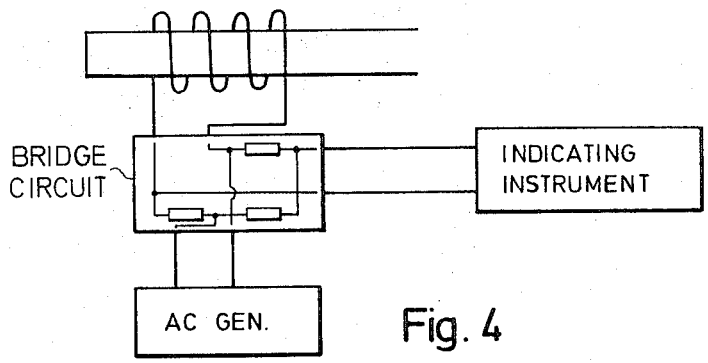
FIG. 4 illustrates in electrical schematic form a circuit arrangement associated with the braking arrangement of FIG. 1.

FIG. 2 illustrates a similar electromechanical transducer comprising a differential transformer 24. FIG. 3 illustrates the advantageous possibility of grounding one of the terminals of the transducer winding, and FIG. 4 illustrates the transducer winding connected in circuit with bridge circuit means including an A.C. generator and a suitable indicating instrument. It is advantageous, for instance, to provide the indicating instrument with a dial calibrated in millimeters of brake shoe lining thickness.

Of course, various modifications of the illustrated arrangement are possible. Whereas the transducer of FIG. 1 incorporates an electromagnetic winding and core arrangement, it is also possible to provide a transducer incorporating capacitive elements. Thus, it would for instance be possible to connect one or both electrodes of a capacitive transducer with the brake shoe lining. Likewise, it would be possible to employ simple resistor means in the transducer, although the use of resistor means, as opposed to capacitor or inductor means, does not so advantageously avoid the need for mechanical contact between the transducer components.

It is most important to appreciate that, while the invention has been illustrated with respect to a brake arrangement having built-in wear-monitoring capability, it is by no means limited its usefulness thereto. As stated earlier, it is equally advantageous to provide, for instance, a friction clutch arrangement having such built-in capability. Indeed, the present invention can be embodied in any mechanical arrangement including components subject to wear.

It will be understood that each of the elements described above, or two or more together, may also find a useful application in other types of constructions differing from the types described above.

While the invention has been illustrated and described as embodied in a brake arrangement having built-in wear-monitoring capability, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent are set forth in the appended claims:

1. In an arrangement of the character described, particularly in a braking arrangement, in combination, a component having at least one portion subject to wear along at least one dimension thereof; electromechanical transducer means comprising mechanical input means operatively associated with said component and movable to a varying extent in dependence on the degree of wear of said component and having electrical output means for furnishing an electrical signal corresponding to the movement of said input means and thereby corresponding to the degree of wear of said component.

2. In an arrangement as defined in claim 1, said transducer means continuously monitoring the degree of wear of said component and producing at said output signals having a continuous range of values corresponding to the continuously varying degree of frictional wear of said component.

3. In an arrangement as defined in claim 1, said transducer means comprising a first part and a second part operatively associated with said component and movable with respect to said first part to a varying extent in dependence on the degree of frictional wear of said component, the value of the signals produced at said output means being a function of the movement of said second part with respect to said first part.

4. In an arrangement as defined in claim 3, said first part being stationary.

5. In an arrangement as defined in claim 3, said component being movable to a varying extent in dependence on the degree of frictional wear thereof, and said second part being connected with said component.

6. In an arrangement as defined in claim 5, said second part being fast with said component.

7. In an arrangement as defined in claim 5, said second part and said component being movable together as a unit.

8. In an arrangement as defined in claim 5; and further including hydraulic cylinder and piston means for moving said component and thereby said second part.

9. In an arrangement as defined in claim 1, said component being movable to a varying extent in dependence on the degree of wear thereof, and said mechanical input means being at least in part connected with said component.

10. In an arrangement as defined in claim 9, said mechanical input means being at least in part fast with said component.

11. In an arrangement as defined in claim 9, at least part of said mechanical input means and said component being movable together as a unit.

12. In an arrangement of the character described, particularly in a braking arrangement, in combination, a component having at least one portion subject to frictional wear along at least one dimension thereof; and monitoring means for monitoring the degree of wear of said component and including output means, and producing at said output means distinguishable signals corresponding to minimum, maximum and intermediate monitored degrees of frictional wear of said component, said monitoring means comprising a first part and a second part together forming inductive pick-up means, said second part being operatively associated with said component and movable with respect to said first part to a varying extent in dependence on the degree of frictional wear of said component, the value of the signals produced at said output means being a function of the movement of said second part with respect to said first part.

13. In an arrangement of the character described, particularly in a braking arrangement, in combination, a component having at least one portion subject to frictional wear along at least one dimension thereof; and monitoring means for monitoring the degree of wear of said component and including output means, and producing at said output means distinguishable signals corresponding to minimum, maximum and intermediate monitored degrees of frictional wear of said component, said monitoring means comprising inductive winding means and also ferromagnetic core means connected with said component and movable with respect to said inductive winding means to a varying extent in dependence on the degree of frictional wear of said component, the value of the signals produced at said output means being a function of the movement of said core means with respect to said inductive winding means, said component being movable to a varying extent in dependence on the degree of frictional wear thereof; and further including hydraulic cylinder and piston means for moving said component and thereby said core means.

14. In an arrangement of the character described, particularly in a braking arrangement, in combination, a component having at least one portion subject to frictional wear along at least one dimension thereof; and monitoring means for monitoring the degree of wear of said component and including output means, and producing at said output means distinguishable signals corresponding to a minimum, maximum and intermediate monitored degrees of frictional wear of said component, said monitoring means comprising a first part and a second part together forming differential transformer means, said second part being operatively associated with said component and movable with respect to said first part to a varying extent in dependence on the degree of frictional wear of said component, the value of the signals produced at said output means being a function of the movement of said second part with respect to said first part.

15. In an arrangement as defined in claim 12, said first part comprising inductive winding means and said second part comprising ferromagnetic core means associated with said winding means.

16. In an arrangement as defined in claim 12, said pick-up means comprising inductive winding means having a grounded terminal.

17. In an arrangement as defined in claim 12, and including brake saddle means, said inductive pick-up means being located on said brake saddle means.

18. In an arrangement as defined in claim 12, said monitoring means including bridge circuit means and said inductive pick-up means being part of said bridge circuit means.

19. In an arrangement as defined in claim 18, and further including indicating means in circuit with said bridge circuit means.

20. In an arrangement as defined in claim 1; and further including indicating means connected with said transducer means.

* * * * *